United States Patent [19]
Best

[11] Patent Number: 5,237,696
[45] Date of Patent: Aug. 17, 1993

[54] METHOD AND APPARATUS FOR SELF-TIMED DIGITAL DATA TRANSFER AND BUS ARBITRATION

[75] Inventor: David W. Best, Marion, Iowa

[73] Assignee: Rockwell International Corporation, Seal Beach, Calif.

[21] Appl. No.: 858,454

[22] Filed: Mar. 27, 1992

Related U.S. Application Data

[62] Division of Ser. No. 180,878, Apr. 13, 1988, Pat. No. 5,140,680.

[51] Int. Cl.⁵ .............................................. G06F 13/36
[52] U.S. Cl. ................................ 395/725; 395/325; 340/825.5; 370/85.2; 364/242.6; 364/242.92; 364/240.1; 364/271.5; 364/DIG. 1
[58] Field of Search ............................. 395/325, 725; 340/825.5, 825.52; 370/85.2

[56] References Cited

U.S. PATENT DOCUMENTS

| | | | |
|---|---|---|---|
| 4,148,011 | 4/1979 | McLagan et al. | 340/825.5 |
| 4,320,467 | 3/1982 | Glass | 364/900 |
| 4,375,639 | 3/1983 | Johnson, Jr. | 340/825.5 |
| 4,593,350 | 6/1986 | Mitchell et al. | 364/200 |
| 4,648,029 | 3/1987 | Cooper et al. | 364/200 |
| 4,779,089 | 10/1988 | Theus | 340/825.5 |
| 4,789,926 | 12/1988 | Clarke | 364/200 |
| 4,881,195 | 11/1989 | DeLong et al. | 364/900 |
| 4,920,486 | 4/1990 | Nielsen | 364/200 |
| 4,961,140 | 10/1990 | Pechanek et al. | 364/200 |
| 4,972,313 | 11/1990 | Getson, Jr. et al. | 364/200 |

Primary Examiner—Michael R. Fleming
Assistant Examiner—Gopal C. Ray
Attorney, Agent, or Firm—John C. McFarren; M. Lee Murrah; H. Fredrick Hamann

[57] ABSTRACT

A self-timed bus arbitration and digital data transfer system is provided for a computer network having multiple master and slave devices sharing a digital data bus. Each master device includes a bus arbitration logic circuit having a time delay element. Each master contending for access to the data bus outputs an identifier on signal lines connecting the master devices. After a period of time comprising the slowest master's operational delay, the bus arbitration circuits determine, on a prioritized basis, which particular master shall have access to the data bus at that time. Upon gaining access, the particular master provides a request signal on a control line connecting the master and slave devices and provides an address on an address bus that may be multiplexed with the data bus. After each slave has decoded the address, as determined by the slowest slave's delay, an acknowledge signal is provided on the control line to the particular master so that data transfer may proceed to/from the selected slave. When the data transfer is complete, the selected slave signals the particular master to release the data bus for subsequent operations. Bus arbitration for a subsequent operation may be performed during the current data transfer. All operations are self-timed in that they do not require a bus clock, but they are constrained through wire-OR logic circuitry by the slowest device connected to the system, which includes all delays resulting from bus length, buffers, and environmental conditions.

5 Claims, 7 Drawing Sheets

METHOD AND APPARATUS FOR SELF-TIMED DIGITAL DATA TRANSFER AND BUS ARBITRATION

This application is a divisional of application Ser. No. 07/180,878, filed on Apr. 13, 1988, now issued as U.S. Pat. No. 5,140,680, on Aug. 18, 1992.

TECHNICAL FIELD

The present invention relates to digital computer networks and, in particular, to a self-timed bus arbitration and data transfer system that does not require a bus clock signal.

BACKGROUND OF THE INVENTION

Digital data transfer generally involves the operations of data transmission by a master device on a data bus and reception of the data by a slave device. In most bus systems, timing characteristics of the data transmissions are determined all or in part by the master device. In these systems the slave device must synchronize with the master device through a clock signal that is either transmitted by or derived from the master device.

Data bus transfers are performed synchronously with a bus clock to determine the timing between control signal edge transitions, or asynchronously with the data access timing determined by the slave device. Synchronous data transfers have a predetermined time within which both address decode and data access must be performed by the slave device. Asynchronous data transfers allow the slave device to determine the time required for data access operations but require a predetermined time period during which the slave device must perform the address decode function.

In computer networks having more than one master device connected to the data bus, a method of bus arbitration is necessary. In synchronous bus arbitration systems, a bus clock may be used along with vie logic techniques. This method of bus arbitration requires a clock frequency selected to match both the speed of the bus master devices and the length of the bus. In typical asynchronous bus arbitration systems, the timing between arbitration states is fixed, and the priority of bus acquisition may be determined by a daisy chained bus grant signal. However, daisy chained arbitration does not continue to function correctly when a master device is removed from the system because removal of a master interrupts the daisy chained circuit.

In computer networks that rely on clock signals for bus arbitration and data transfer, the clock timing must be set to handle worst case conditions attributable to system technology, environmental conditions such as temperature, and the physical separation of master and slave devices. Setting the timing in these systems penalizes most operations which do not exhibit worst case conditions. Adjusting the timing parameters to fit each operation removes this penalty but causes incompatabilities because components designed for one operation may not perform correctly in another.

When the relative distance between the master and slave devices or the data transmission rate is increased, the propagation delay of the signal becomes a significant portion of the data transfer period. In a typical system, a master device has no knowledge of what the relative signal skew time will be between it and the slave devices. Thus, bus timing specifications are forced to be set for operation under worst case bus length, temperature, and device speed conditions.

In VLSI systems, signal propagation delay becomes of significant importance. The data transmission rates in VLSI systems are so high that a propagation delay of a few nanoseconds can be a significant factor in determining data transmission timing. Because VLSI devices using conventional bus technology must be designed to operate under worst case signal propagation conditions, a master VLSI device must use transfer timing that will allow a slave device to be placed on another circuit board (50 to 100 nanoseconds propagation delay) even though the slave device may be placed within the same package (1 to 5 nanoseconds propagation delay).

The basic problem of digital data transmission is that all slave devices do not see the transmission clock signal at the same time, and as the speed or distance of data transmission increases, so does the relative clock skew between devices. Therefore, large computer networks or VLSI systems cannot operate at their full performance potential without a self-timed data transfer technique that does not rely on a system clock signal. Thus, there is a need for a self-timed bus arbitration and data transfer scheme that allows computer systems to operate at their optimum efficiency of all times rather than under constant worst case constraints.

SUMMARY OF THE INVENTION

The present invention is designed for implementation with a computer system having multiple master and slave devices sharing a digital data bus. The invention is a method and apparatus for self-timed bus arbitration and digital data transfer that does not require a bus clock signal.

When multiple master devices each have access to a shared data bus, bus arbitration must be performed to select which of the potential master devices will have access to the bus at any particular time. In the present invention, each master device sharing the bus has a bus arbitration logic circuit including a time delay element. When no master device is actually using the bus, signals on lines connecting the master devices oscillate at a frequency established by the delay, including any delay caused by bus length or environmental conditions, imposed by the slowest master device on the bus. Each master contending for access to the data bus outputs an identifier on the signal lines connecting the master devices. The bus arbitration logic circuits in each master determine, on a prioritized basis, which master shell have access to the data bus at a particular time.

After gaining access to the data bus, the controlling master provides a request signal on a logic line connecting the master and slave devices. The master also provides an address on an address bus. In an alternative embodiment, the address bus may be multiplexed with the data bus. After each slave has decoded the address, which requires a time determined by the delay imposed by the slowest slave device including any delay caused by bus length or environmental conditions, an acknowledge signal is provided on the logic line to the master so that data transfer may proceed. When the data transfer has been completed, the slave device signals the master to release the data bus for subsequent operations.

Self-timed operations do not require a bus clock signal to synchronize the devices sharing a data bus. Self-timed data transfers allow parallel data words to be transferred between a master device and a slave device, with the slave devices on the bus determining the time delays between control signal transitions. Because each slave device has unique timing characteristics with respect to address decoding and data access times, self-timed data transfer permits the system data bus to operate at the maximum speed possible for any particular configuration of slave devices in the system. Thus, the system retains its optimum efficiency as devices, such as output displays, printers, and encoders, are added to or removed from the bus.

Depending on operational requirements, a computer system may use either self-timed bus arbitration or self-timed data transfer or both. In systems using both self-timed schemes, bus arbitration for a subsequent operation may be performed during the current data transfer. In the present invention, all operations are self-timed in that they do not require a bus clock signal and are constrained only by the slowest device connected to the computer system. In addition, self-timed data transfers are effective in automatically adjusting data transfer timing to account for bus length, bus interface delays, and environmental conditions. Therefore, efficiency of the computer system is improved because the devices are not constrained by a bus clock set for worst case conditions.

BRIEF DESCRIPTION OF THE DRAWINGS

For a more complete understanding of the present invention and for further advantages thereof, reference is made to the following Description of the Preferred Embodiments taken in conjunction with the accompanying Drawings, in which the same symbols and reference characters indicate the same or similar aspects of the various embodiments of the present invention illustrated in the several FIGURES as follows.

DESCRIPTION OF THE PREFERRED EMBODIMENTS

Figure 1:
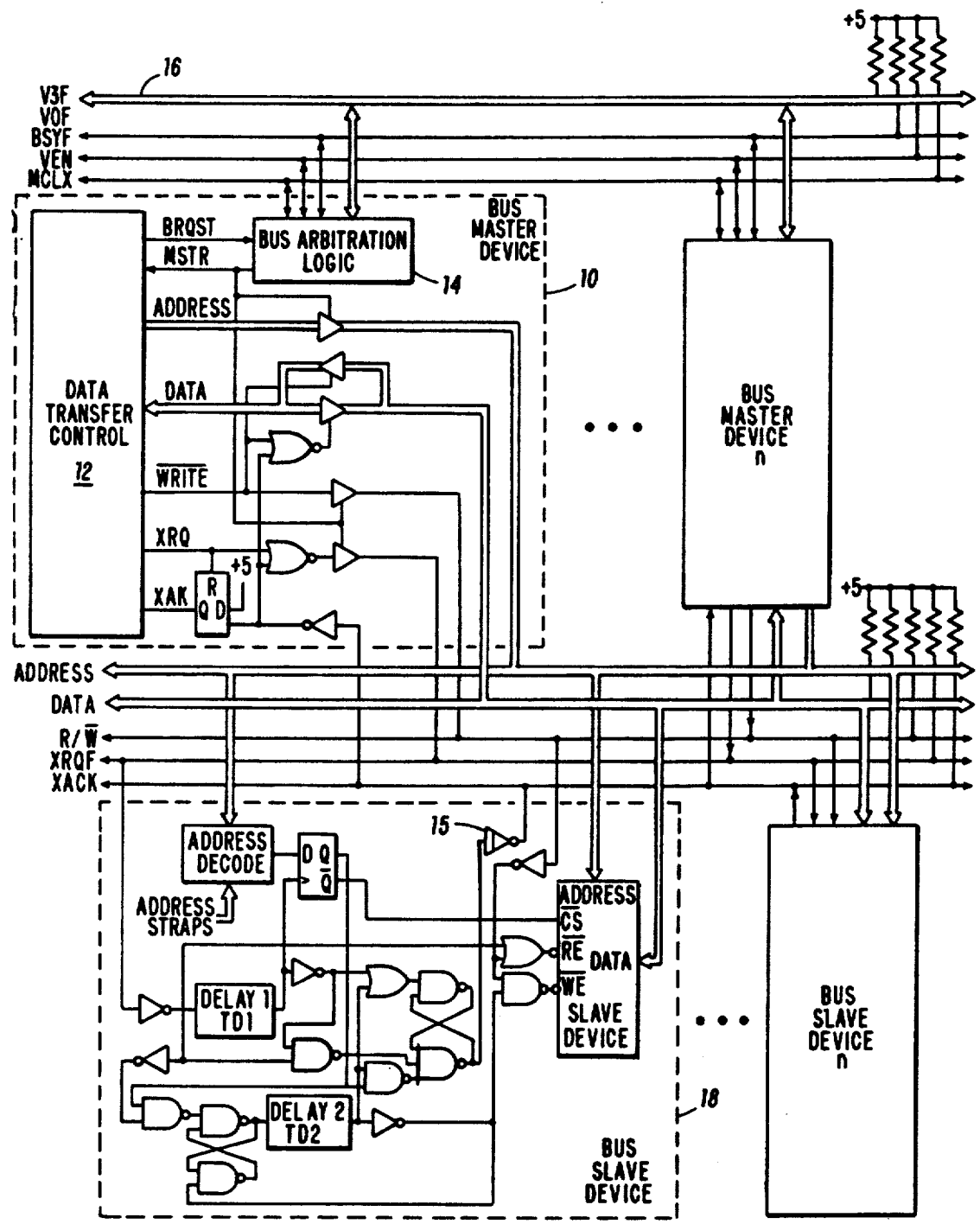
FIG. 1 is a schematic diagram of a computer system having multiple master and slave devices utilizing self-timed bus arbitration and digital data transfer.

FIG. 1 is a schematic diagram of a computer network in which master device 10 through master device n are connected to a DATA bus. Each master device includes data transfer control 12, bus arbitration logic 14, and other well-known logic circuitry elements connected as illustrated. All of the master devices are interconnected through their bus arbitration logic circuits 14 by signal lines BSYF, VEN, MCLK, and vie line 16. Although FIG. 1 illustrates separate ADDRESS and DATA buses, these buses may be multiplexed as described below in conjunction with an alternative embodiment of the present invention.

Connected to the ADDRESS and DATA buses are slave device 18 through slave device n. Slave device 18 includes time delays TD1 and TD2 and other well-known logic circuitry elements connected as illustrated in FIG. 1. The slave and master devices are all connected by control lines R/$\overline{W}$, XRQF, and XACK.

Figure 2:
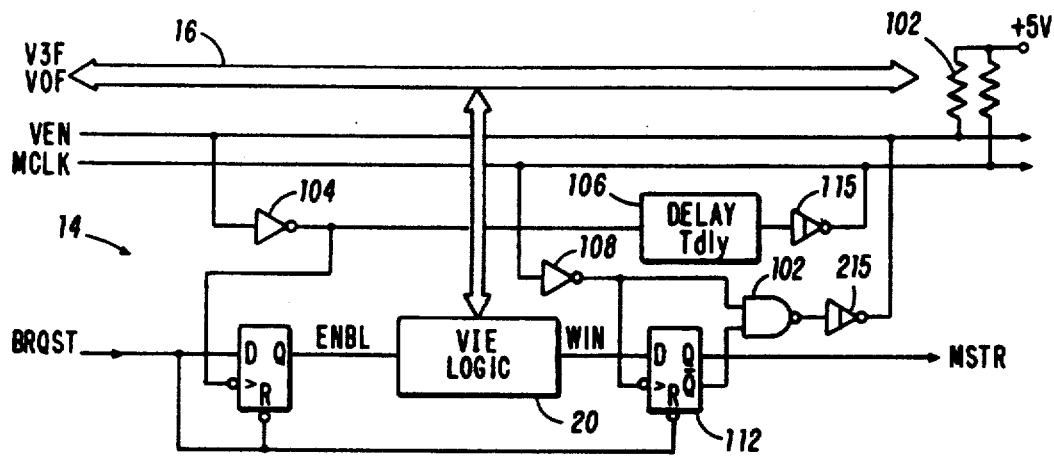
FIG. 2 is a schematic diagram of one embodiment of the bus arbitration logic circuit of a master device.

Bus arbitration logic 14 is illustrated in greater detail in FIG. 2. Self-timed bus arbitration is performed using signals on vie line 16 and the VEN and MCLK lines. All of the signals on these lines are driven with logic elements 15, which may comprise N-channel FETs or NPN transistors with their respective sources or emitters connected to ground, for example, and pulled high through resistors. Bus arbitration logic 14 includes vie logic 20 and a DELAY that imposes a time delay of Tdly.

When no master device is actually using the bus, the VEN and MCLK signals oscillate at a frequency determined by the time delay Tdly imposed by the slowest master device on the bus, thus forming self-timed signals. The apparent length of time delay Tdly will increase as the length of the bus increases and when propagation delays of buffers and logic elements increase.

Figure 3:
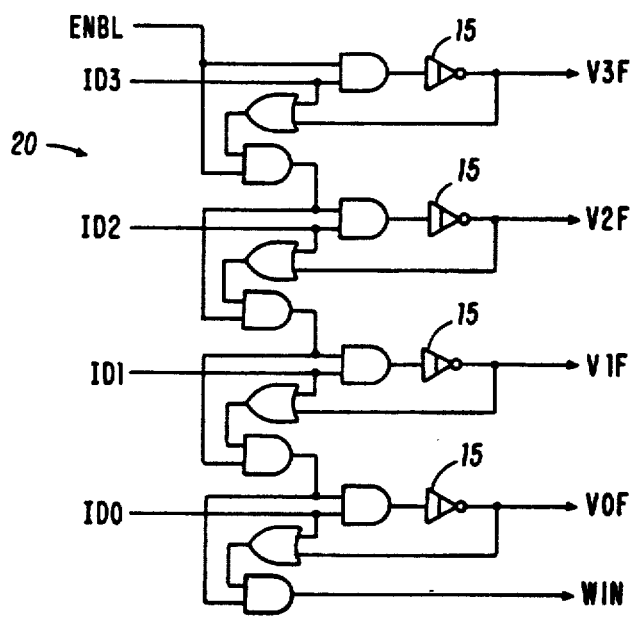
FIG. 3 is schematic diagram of the vie logic of a bus arbitration logic circuit of a master device.

FIG. 3 is a schematic diagram of vie logic 20. Master device identifier signals ID0, ID1, ID2, and ID3 are processed by vie logic 20 and output on lines V0F, V1F, V2F, and V3F, respectively, which comprise vie line 16.

Figure 4:
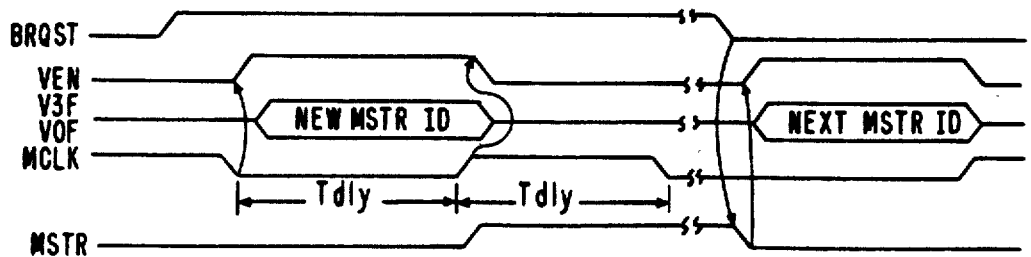
FIG. 4 is a timing diagram for the bus arbitration logic circuit illustrated in FIG. 2.

Referring to FIG. 4 in conjunction with FIGS. 2 and 3, a master device needing access to the bus asserts bus request signal BRQST high. On the next rising edge of the vie enable signal VEN, BRQST, is synchronized and a bus arbitration cycle begins. Each master device contending for access to the bus places its unique identifier on vie line 16 as determined by the vie logic illustrated in FIG. 3. Following a delay period determined by the slowest master's Tdly through wired-OR logic circuitry, all cotending master devices will have made a decision with one particular master's vie logic having generated a WIN signal. WIN is then latched on the next rising edge of MCLK to form a MSTR signal indicating that the particular master is in control of the bus.

When a particular master device has been granted access to the bus, that master holds VEN low, which also holds MCLK low following a delay period which is determined by the slowest master's time delay Tdly. Holding VEN low inhibits further contention for access to the bus. The bus is released when the master with access lowers the BRQST signal. This resets MSTR and allows VEN to rise again. The rising edge of VEN then begins a new bus arbitration cycle.

The embodiment described in conjunction with FIGS. 2-4 requires bus arbitration to be performed between data transfer operations. A typical system may require about 200 nanoseconds to perform bus arbitration and about 300 nanoseconds to perform a data transfer. If the bus must be acquired for each data transfer, a total of about 500 nanoseconds per data transfer is consumed. If arbitration for the next bus master can be performed while the current bus master is conducting a data transfer, the total cycle can be reduced to approximately 300 nanoseconds per data transfer.

Figure 5:
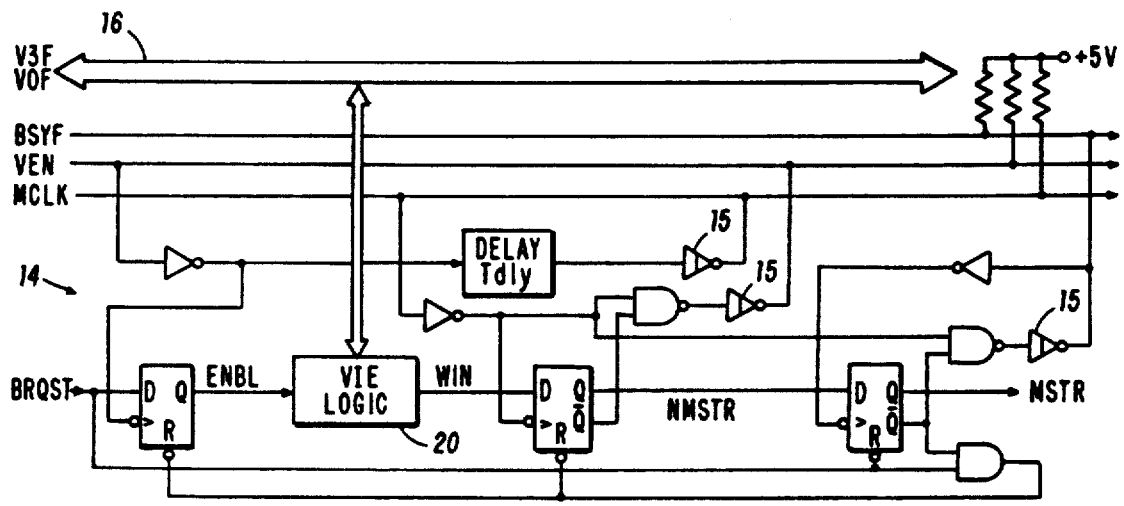
FIG. 5 is a schematic diagram of a bus arbitration logic circuit having look ahead bus grant capability.

Self-timed bus arbitration with look ahead for granting bus access is performed by the embodiment of bus arbitration logic 14 illustrated in FIG. 5. The major difference from the previous embodiment without look ahead capability is the addition of a bus busy signal line BSYF. When no master device is actually using the bus, the BSYF signal oscillates with the MCLK and VEN signals.

Figure 6:
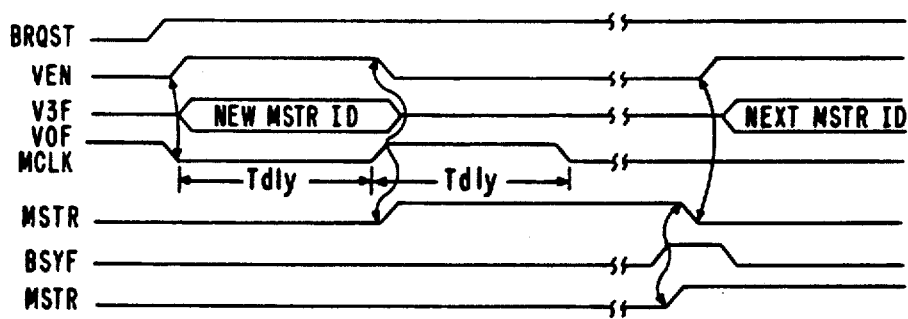
FIG. 6 is a timing diagram for the bus arbitration logic circuit illustrated in FIG. 5.

FIG. 6 illustrates the self-timed look ahead bus arbitration timing of the circuit illustrated in FIG. 5 when the bus is busy. To gain access to the bus, a master asserts bus request signal BRQST high. This is synchronized on the next rising edge of VEN which begins a new bus arbitration cycle, as shown in FIG. 6. After a time delay Tdly, the vie logic 2C on one of the contending master devices will assert WIN high. This is latched on the next rising edge of MCLK, designating the next master by asserting NMSTR high. Bus access is granted to the next master on the next rising edge of bus busy signal BSYF, resulting in MSTR going high and resetting NMSTR. The bus busy signal BSYF is held low while MSTR is high, indicating that the bus is in use. However, a BSYF low does not inhibit bus arbitration, which may begin again on the next rising edge of VEN.

As shown in FIG. 6, if bus arbitration is performed while the bus is busy as indicated by BSYF low, the granting of bus access must be delayed until the current master releases BSYF. Following the bus arbitration cycle, the next master is designated by NMSTR going high. This event holds VEN low, which also inhibits any further rising edges on MCLK. When the current master releases the bus by lowering BRQST, MSTR, is reset, which releases BSYF. The rising edge of BSYF allows the new master to latch NMSTR, forcing its MSTR signal high. This resets NMSTR, which releases VEN and MCLK and allows a new arbitration cycle to begin.

Figure 12:
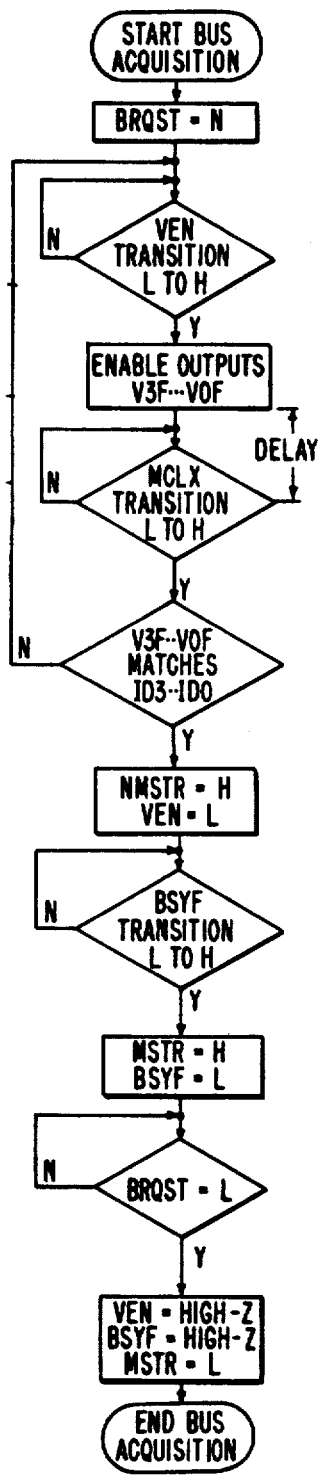
FIG. 12 is a flow diagram illustrating the self-timed bus arbitration and look ahead bus grant logic of the present invention.

The foregoing description is also illustrated by the logic flow diagram of FIG. 12. In FIG. 12, H indicates a logic high, L indicates a logic low, and HIGH-Z indicates a high impedance state of a logic signal driver. The logic flow diagram of FIG. 12 is useful in understanding the sequence of events depicted in the timing diagram of FIG. 6.

Figure 7:
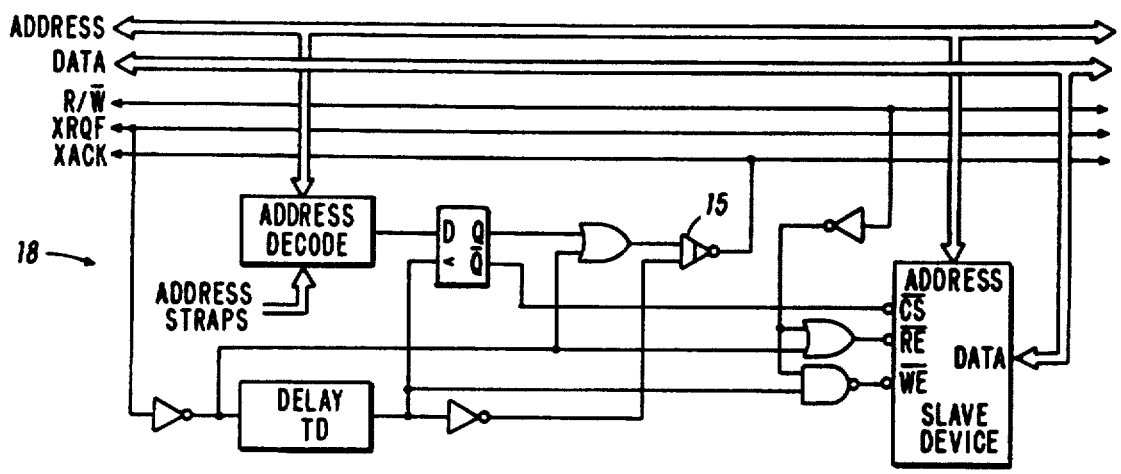
FIG. 7 is a schematic diagram of a slave device having separate address and data buses and a single time delay element.

FIG. 7 illustrates an embodiment of slave device 18 that performs non-multiplexed, self-timed data transfers with a single time delay TD. In addition to the ADDRESS and DATA buses, control lines R/$\overline{W}$XRQF, and XACK connect all the devices. The read-write line R/$\overline{W}$ determines the direction of the data transfer. During a read, a selected slave device transfers the addressed data word to the master. During a write, the master transfers a data word to a selected slave.

Figure 8:
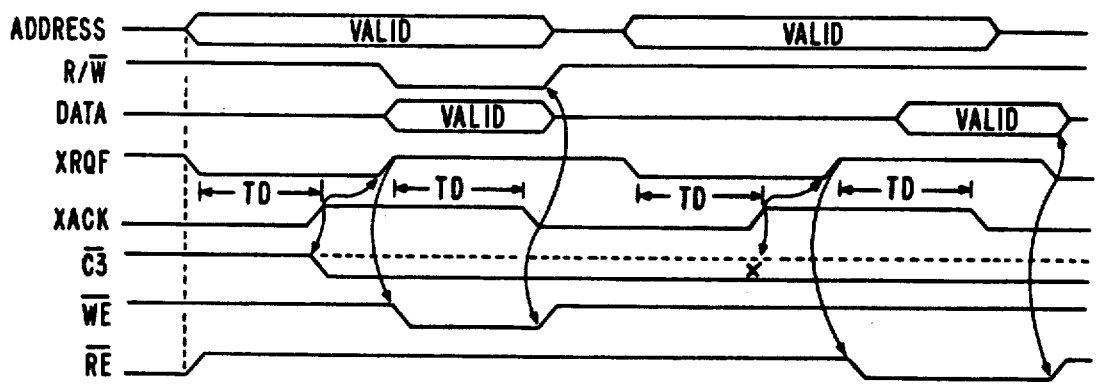
FIG. 8 is a timing diagram for the slave device illustrated in FIG. 7.

FIG. 8 illustrates the timing sequence for the slave device 18 illustrated in FIG. 7. A data transfer is initiated when the master asserts the transfer request signal XRQF low. This event signals all slave devices that a read or write to the supplied address is pending. The time required for an address decode is determined by the time delay TD of the slowest slave device, including delays associated with buffers, environmental conditions, and bus length. After a period of TD following assertion of XRQF low, each slave device releases the transfer acknowledge line XACK. XACK is driven with logic element 15 and pulled high with a resistor. When the slave with the longest time delay TD releases XACK, through wired-OR logic circuitry, the master detects a low to high transition. This event signals the completion of address decoding by all slaves on the bus. The addressed slave's circuitry then asserts a select signal $\overline{CS}$ low to indicate selection of that slave for the data transfer.

After XACK has gone high, the master asserts XRQF high, signaling the start of the data transfer. If the transfer is a write, the master asserts R/$\overline{W}$ low, and the slave receives a data word from the bus and asserts the write enable $\overline{WE}$ line low. Following the selected slave's delay TD, during which the data transfer is performed, the selected slave asserts XACK low to signal the master that the data transfer is complete. At the same time, $\overline{WE}$ is pulled high to terminate the data write operation. Data hold time is inherent to the delay between $\overline{WE}$ going high and the master receiving XACK low. If additional time is required, the slave device can generate a write pulse which terminates prior to the assertion of XACK low.

For a data read operation, the slave's circuitry asserts $\overline{CS}$ low to indicate selection for the data transfer and asserts read enable $\overline{RE}$ low to enable output of the address data word. Following the selected slave's delay TD, the selected slave asserts XACK low to signal the master that the addressed data word is valid on the bus. The addressed slave will continue to output data until XRQF is asserted low to initiate the next bus transaction. This provides data hold time for the master.

The slave device 18 of FIGS. 7 and 8 may also be connected to a multiplexed ADDRESS/DATA bus. The operation of an embodiment of the present invention with a multiplexed bus is described below in conjunction with FIGS. 9 and 10.

A disadvantage of using a single time delay element to control both the address decode and the data transfer time periods is that the data transfer generally requires more time than does the address decode. With a single time delay element, data transmissions are slowed when the address decode period is forced to be the same length of time as the data transfer.

Figure 9:
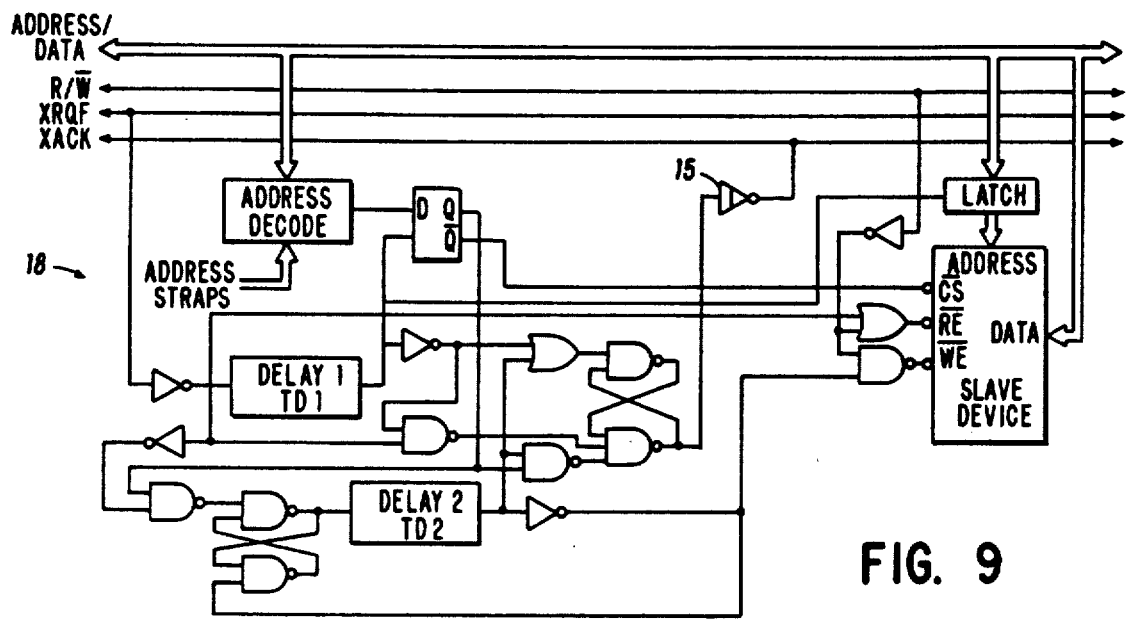
FIG. 9 is a schematic diagram of a slave device having a multiplexed address/data bus and dual time delay elements.

FIG. 9 illustrates an embodiment of slave device 18 having a multiplexed ADDRESS/DATA bus and dual time delay elements TD1 and TD2. In this embodiment, TD1 controls the address decode time and TD2 controls the data transfer time.

Figure 10:
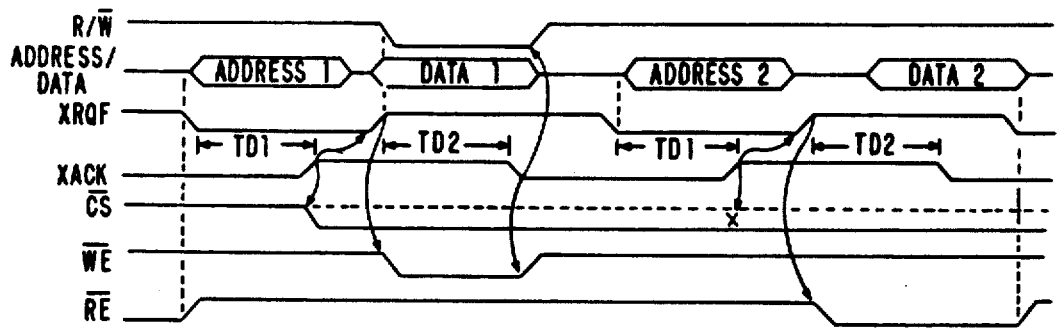
FIG. 10 is a timing diagram for the slave device illustrated in FIG. 9.

Referring to the timing diagram of FIG. 10 in conjunction with FIG. 9, a data transfer is initiated when the master asserts transfer request signal XRQF low. The time required for address decode is determined by the time delay TD1 of the slowest slave device, including delays associated with buffers, environmental conditions, and bus length. Each slave device releases the transfer acknowledge line XACK after its time delay TD1 has passed following the assertion of XRQF low. When the slave with the longest delay TD1 releases XACK by means of wired-OR logic circuitry, the master detects a low to high transition. This event signals the completion of address decoding by all slave devices on the bus. The addressed slave's circuitry asserts a select signal $\overline{CS}$ low to indicate its selection for the data transfer.

After XACK has gone high, the master asserts XRQF high, signalling the start of the data transfer. If the transfer is a write, the master asserts R/$\overline{W}$ low, and the slave receives a data word from the bus and asserts its write enable $\overline{WE}$ line low. Following the selected slave's data transfer delay TD2, the selected slave asserts XACK low to signal the master that the transfer is complete. At the same time, $\overline{WE}$ is pulled high to terminate the data write operation. Data hold time is inherent to the delay between $\overline{WE}$ going high and the master receiving XACK low. If additional time is required, the slave can generate a write pulse which terminates prior to the assertion of XACK low. If the data transfer is a read, the master tri-states the data bus following a low to high transition on XACK, and the selected slave device outputs the addressed data word.

Figure 11:
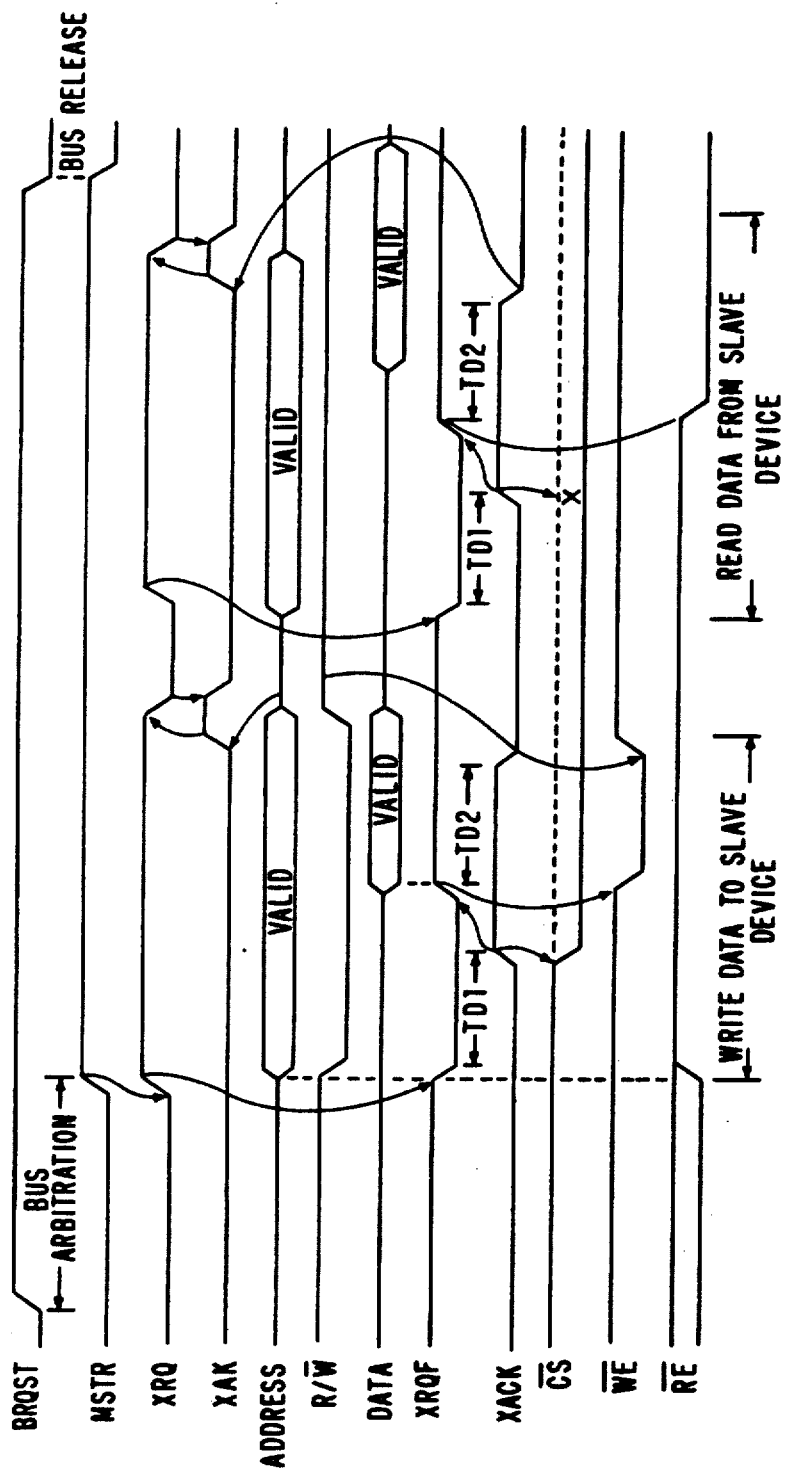
FIG. 11 is a timing diagram for self-timed bus arbitration and data transfer in the system illustrated in FIG. 1.
Figure 13:
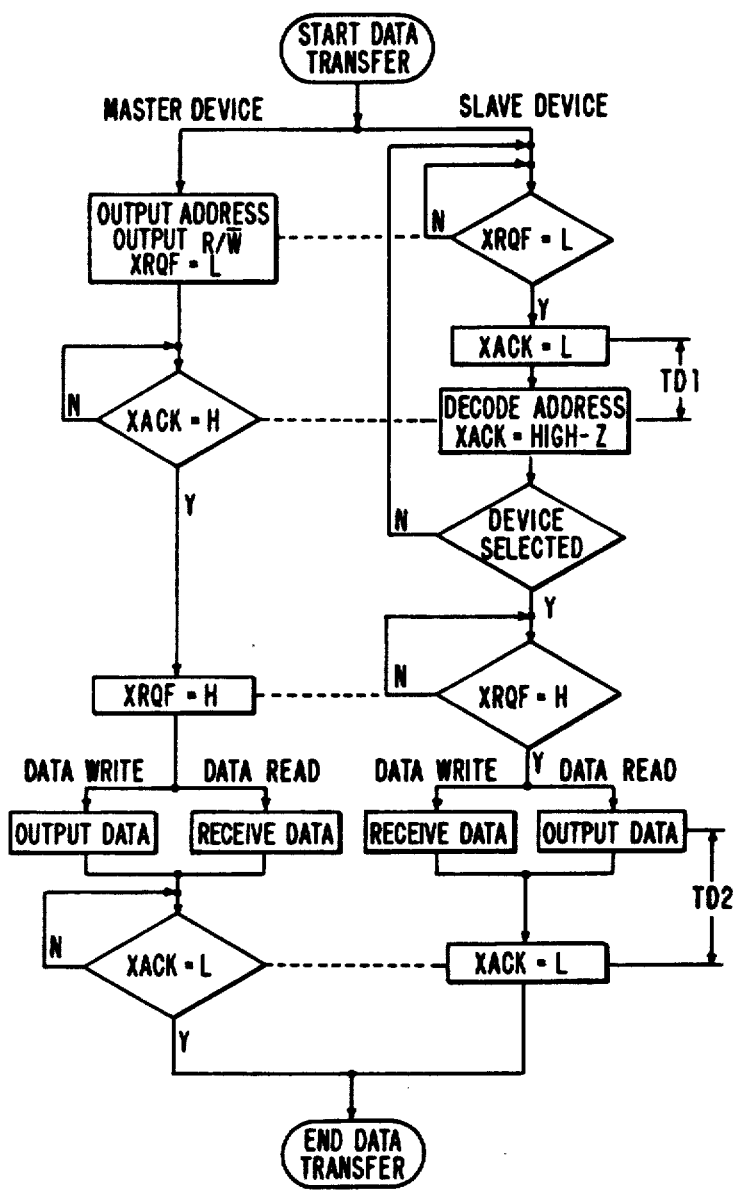
FIG. 13 is a flow diagram of the self-timed data transfer logic for the master and slave devices of the present invention.

Referring to FIGS. 11 and 13, FIG. 11 is a timing diagram for self-timed bus arbitration and data transfer for the complete system illustrated in FIG. 1. The system of FIG. 1 includes a non-multiplexed, dual time delay embodiment of slave device 18 similar to the embodiments described above. The logic flow diagram of FIG. 13 aids in understanding the data transfer timing diagrams of FIGS. 8, 10, and 11. In FIG. 13, H indicates a logic high, L indicates a logic low, HIGH-Z indicates a high impedance state of a logic signal driver, and the dashed lines indicate synchronization points between the master and slave devices.

Although the present invention has been described with respect to the specific embodiments thereof, various changes and modifications may be suggested to one skilled in the art, and it is intended that the present invention encompass such changes and modifications as fall within the scope of the appended claims.

I claim:

1. Apparatus for arbitrating access of a plurality of devices to a bus in computer network, comprising:
    a signal line connecting each of said plurality of devices;
    a bus arbitration logic circuit connected to each of the plurality of devices and to the signal line;
    means for generating on said signal line an oscillating signal having a period of oscillation determined by a time delay associated with the slowest one of said plurality of devices;
    means responsive to the bus arbitration circuit and said signal line for granting exclusive access of a particular one of said plurality of devices to the bus; and
    means for holding said oscillating signal in a steady state when said particular one of said devices has been granted exclusive access to said bus.

2. The apparatus of claim 1 wherein said means for granting exclusive access comprises:
    means for providing a bus request signal for each of said plurality of devices requesting access to said bus; and
    means for providing an identifier signal on said signal line for said bus arbitration logic circuit of each one of said plurality of devices requesting access to said bus.

3. The apparatus of claim 2, further comprising:
    means for releasing said bus from exclusive access by said particular one of said plurality of devices; and
    means for returning said oscillating signal to said period of oscillation after release of said bus.

4. A self-timed bus arbitration apparatus, comprising:
    a signal line initially having a signal thereon representative of a first logical state;
    a plurality of devices connected to the bus;
    a plurality of logic circuits each of which is connected to one of the plurality of devices and to the signal line;
    means in each of said plurality of logic circuits for providing an intermediate signal after a predetermined delay related to the propagation delay through each of said logic circuits; and
    means in each of said plurality of logic circuits for changing the signal on said signal line to a second logical state responsive to the intermediate signal from the logic circuit having the longest delay.

5. Apparatus for arbitrating access of a plurality of devices to a bus in computer network, comprising:
    a signal line connecting each of said plurality of devices;
    a bus arbitration logic circuit connected to each of the plurality of devices and to the signal line;
    means for generating on said signal line an oscillating signal having a period of oscillation determined by a time delay associated with the slowest one of said plurality of devices;
    means responsive to the bus arbitration circuit and said signal line for granting exclusive access of a particular one of said plurality of devices to the bus;
    means for determining when said particular one of said devices has been granted exclusive access to said bus; and
    means responsive to the determining means for holding said oscillating signal in a steady state.

* * * * *